United States Patent
Chambers

(10) Patent No.: US 11,668,127 B2
(45) Date of Patent: Jun. 6, 2023

(54) AIRCRAFT DOOR MECHANISM, AND ASSOCIATED AIRCRAFT AND MOVING METHOD

(71) Applicant: DASSAULT AVIATION, Paris (FR)

(72) Inventor: Patrick Chambers, Saint Cloud (FR)

(73) Assignee: DASSAULT AVIATION, Paris (FR)

( * ) Notice: Subject to any disclaimer, the term of this patent is extended or adjusted under 35 U.S.C. 154(b) by 114 days.

(21) Appl. No.: 17/077,518

(22) Filed: Oct. 22, 2020

(65) Prior Publication Data
US 2021/0123278 A1    Apr. 29, 2021

(30) Foreign Application Priority Data
Oct. 23, 2019 (FR) ...................................... 1911848

(51) Int. Cl.
*B64C 1/14* (2006.01)
*E05D 15/56* (2006.01)
*E05D 15/20* (2006.01)
*B64D 11/00* (2006.01)
*E05D 15/24* (2006.01)

(52) U.S. Cl.
CPC ............ *E05D 15/20* (2013.01); *B64C 1/1407* (2013.01); *B64C 1/1415* (2013.01); *B64D 11/003* (2013.01); *E05D 15/248* (2013.01); *E05D 15/56* (2013.01); *E05Y 2900/502* (2013.01)

(58) Field of Classification Search
CPC ..... B64C 1/1423; B64C 1/143; B64C 1/1438; E05F 15/681; E05F 15/6684; E05F 15/686; E05D 15/20; E05D 15/38; E05D 15/401; E05D 15/445
See application file for complete search history.

(56) References Cited

U.S. PATENT DOCUMENTS 3,802,125 A * 4/1974 Baker ................... E05F 15/665
                                                         49/40
4,106,729 A    8/1978 Bergman et al.
4,470,566 A * 9/1984 Fitzgerald ............... B64C 1/143
                                                         292/201
(Continued)

FOREIGN PATENT DOCUMENTS

WO     WO84/01140 A1     3/1984

OTHER PUBLICATIONS

Search Report for priority application FR 1911848.

*Primary Examiner* — Joshua J Michener
*Assistant Examiner* — Ka Chun Leung
(74) *Attorney, Agent, or Firm* — Davidson, Davidson & Kappel, LLC

(57) ABSTRACT

An aircraft door mechanism includes an aircraft structure (14) delimiting an opening (24); an aircraft door (26) movable between a position closing off the opening (24) and a released position of the opening (24); and a guide system (28) for moving the door (26) between the closed off and released positions. The guide system (28) includes a main rail (46) that is fixed relative to the structure and a main carriage (48) mechanically connected to the door (26) and able to slide on the main rail (46) during the movement between said closed off and released positions. The main rail (46) is positioned between the door (26) and the structure during at least part of the movement of the door (26) between said closed off and released positions.

13 Claims, 9 Drawing Sheets

(56) References Cited

U.S. PATENT DOCUMENTS

| | | | | |
|---|---|---|---|---|
| 5,636,814 A | * | 6/1997 | Rollert | B64C 1/143 244/129.4 |
| 2011/0315822 A1 | * | 12/2011 | Fairchild | E05F 15/652 244/129.5 |

* cited by examiner

AIRCRAFT DOOR MECHANISM, AND ASSOCIATED AIRCRAFT AND MOVING METHOD

The present disclosure relates to an aircraft door mechanism, including at least:
- an aircraft structure delimiting an opening;
- an aircraft door mounted moving relative to the structure between a closed off position, in which the door closes off the opening, and a released position, in which the door is positioned away from the opening;
- a guide system configured to guide a movement of the door between said closed off and released positions, the guide system comprising a main rail that is fixed relative to the structure and a main carriage mechanically connected to the door, the main carriage being able to slide on the main rail during the movement of the door between said closed off and released positions.

The mechanism is in particular intended on the one hand to equip a civil aviation aircraft, for example a business jet, and on the other hand to equip a door of a baggage compartment of the aircraft.

BACKGROUND

In the known aircraft, the door mechanisms generally include mechanical weight compensators associated with cables, and four lateral guide rails of the door, which impose the trajectory of the door. The mechanisms also include inner and outer handles for manual manipulation of the door and a locking mechanism.

However, these mechanisms have drawbacks.

First, the opening and closing of the door, as well as its locking and unlocking, involve actions by the user that require forces in positions that are sometimes uncomfortable, despite the presence of the mechanical weight compensators.

For example, an operator must manipulate one of the handles and raise or lower the door while crouching in the hold, when the operator is inside the aircraft, or with his arms in the air, when he is outside it.

Additionally, the mechanical weight compensating devices are particularly heavy for the aeronautic field. In particular, they are generally made up of springs and can weigh several kilograms.

Likewise, the known locking mechanisms can weigh several kilograms.

SUMMARY

One aim of the present disclosure is therefore to provide a connecting mechanism between an aircraft door and a structure of the aircraft having good ergonomics, a small space requirement and a reduced weight.

It is also desirable for such a mechanism to have good robustness, good perceived quality and low production costs.

The present disclosure thus relates to an aircraft or mechanism of the aforementioned type, wherein the main rail is positioned between the door and the structure during at least part of the movement of the door between said closed off and released positions.

The mechanism according to the present disclosure may comprise one or more of the following features, considered alone or according to any technically possible combination(s):

- the guide system further comprises at least one connecting rod, the main carriage being mechanically connected to the door by means of the connecting rod, the connecting rod being articulated to the main carriage on the one hand and to the door on the other hand;
- the connecting rod is able to lock the door in the closed off position, the connecting rod including an extension return system configured to exert an elastic force on the main carriage, and the connecting rod being able to be over-centered relative to the main carriage;
- the extension return system of the connecting rod comprises at least one resiliently deformable member or gas cylinder;
- the main rail extends along a curve contained in a movement plane, and, projected in the movement plane, an angle between the connecting rod and the main carriage is limited by an angle stop positioned on the connecting rod or on the main carriage;
- the guide system further comprises at least two pairs of abutments, each pair comprising an upper abutment secured to the door and a lower abutment secured to the structure, the pairs of abutments forming a pivot support for the door relative to the structure during at least part of the movement of the door between said closed off and released positions;
- the main rail extends along a curve contained in a movement plane, and, when the pairs of abutments form a pivot support of the door, the lower and upper abutments of each pair are respectively in contact, a pivot axis passing through each pair being perpendicular to said movement plane;
- for each pair of abutments, one of the upper abutment and the lower abutment is a finger and the other is a housing able to receive one end of the finger;
- the guide system further comprises at least one lateral rail that is fixed relative to the aircraft structure, and a lateral carriage, the lateral carriage being mechanically connected to the door and able to slide on the lateral rail during the movement of the door between said closed off and released positions;
- the door has an inner face with no protrusion and indentation;
- the mechanism comprises a gear motor, the guide system further comprising at least one mechanical transmission member, the or each mechanical transmission member being secured to the main carriage and being connected to the gear motor, the gear motor being able to mechanically actuate the or each mechanical transmission member in order to move the door relative to the structure between said closed off and released positions; and
- the mechanism comprises an electrical control system of the gear motor, the electrical control system being able to be activated manually by an operator.

The present disclosure also relates to an aircraft including a mechanism as described above.

The aircraft according to the present disclosure may comprise one or more of the following features, considered alone or according to any technically possible combination:

- the structure defines a baggage compartment, the opening being defined in the baggage compartment, the door being a baggage compartment door; and
- the aircraft comprising an avionics system and an electricity production and/or storage device, the electricity production and/or storage device supplying the avionics system and the gear motor.

The present disclosure further relates to a method for moving an aircraft door, comprising:

providing a mechanism as defined above, the door being in one of the closed off position and the released position; and moving the door toward the other of the closed off position and the released position, the movement being guided by the guide system, the main rail being positioned between the door and the structure during at least part of the movement of the door.

The present disclosure also relates to an aircraft door mechanism, including at least:

an aircraft structure delimiting an opening;

an aircraft door mounted moving relative to the structure between a closed off position, in which the door closes off the opening, and a released position, in which the door is positioned away from the opening;

a gear motor, the gear motor being configured to move the door relative to the structure between said closed off and released positions.

Such a mechanism further optionally comprises a guide system configured to guide a movement of the door between said closed off and released positions, the guide system comprising at least one mechanical transmission member, a main rail that is fixed relative to the structure and a main carriage mechanically connected to the door, the main carriage being able to slide on the main rail during the movement of the door between said closed off and released positions, the mechanical transmission member being secured to the main carriage and being connected to the gear motor, the gear motor being able to mechanically actuate the mechanical transmission member in order to move the door relative to the structure between said closed off and released positions.

The mechanism may comprise one or more of the aforementioned features, considered alone or according to any technically possible combination(s).

The present disclosure will be better understood upon reading the following description, provided solely as an example, and in reference to the appended drawings, in which.

DETAILED DESCRIPTION

Figure 1:
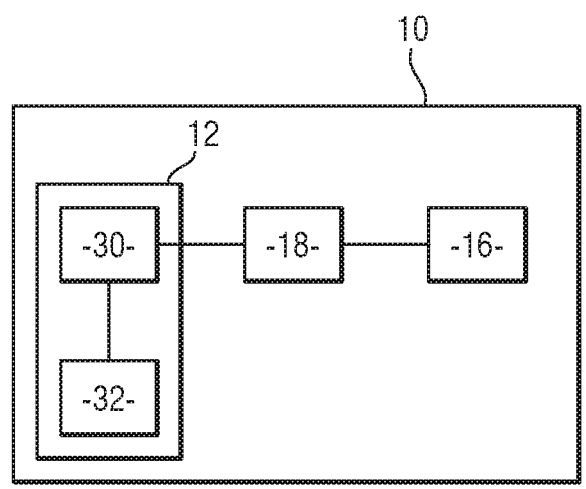
FIG. 1 is a schematic view of an aircraft including a door mechanism.
Figure 2:
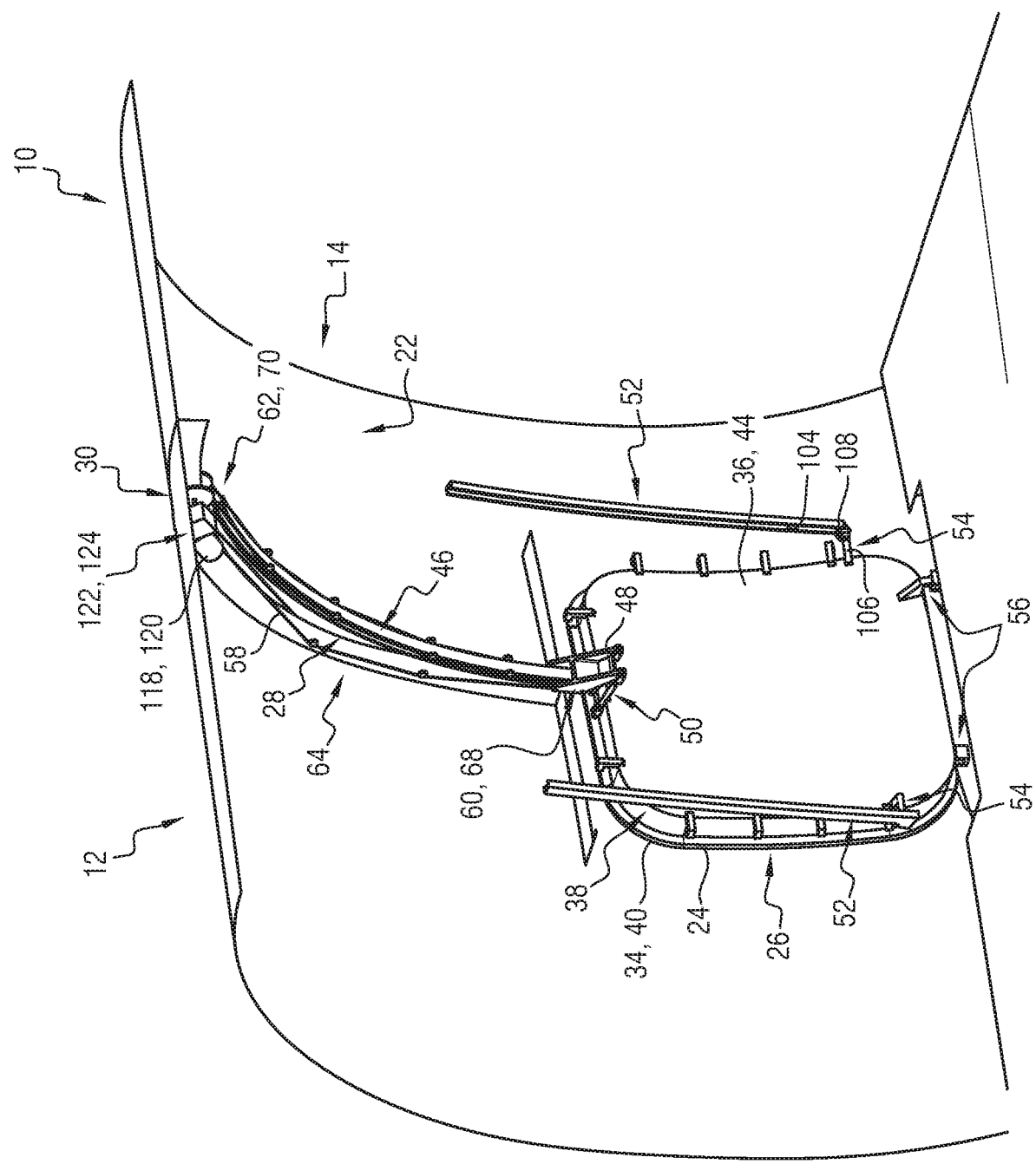
FIG. 2 is a schematic perspective view of the aircraft door mechanism, in which the door is locked in the closed off position.

An aircraft 10 is illustrated in FIG. 1, a detail of the aircraft 10 comprising an aircraft door mechanism 12 being illustrated in FIG. 2.

The aircraft 10 preferably has a maximum takeoff weight (MTOW) of less than 55,000 kg.

Additionally, the aircraft 10 is configured for a maximum permissible number of passengers on board (PAX) less than or equal to 19.

It is for example a business airplane.

The aircraft 10 comprises a structure 14, referred to hereinafter as "aircraft structure".

The aircraft 10 typically comprises an avionics system 16 and an electricity production and/or storage device 18.

The aircraft 10 extends along a longitudinal direction between a front and a rear.

More specifically, the aircraft 10 comprises a nose positioned at the front of the aircraft 10 and a vertical stabilizer positioned at the rear.

The aircraft structure 14 is for example a fuselage.

The aircraft structure 14 has an outer surface 20 and an inner surface 22.

The outer surface 20 is in contact with a mass of air outside the aircraft 10.

The inner surface 22 delimits an inner volume.

In the preferred example of FIG. 2, the aircraft structure 14 defines a baggage compartment of the aircraft.

The baggage compartment is in particular intended to store luggage or equipment prohibited in the passenger compartment by air regulations.

For example, the luggage compartment is intended to store luggage whose dimensions exceed the dimensions authorized in the passenger compartment or whose weight exceeds that authorized in the passenger compartment.

In particular, the passenger compartment is devoid of seats.

Furthermore, the aircraft structure 14 delimits an opening 24.

The opening 24 is thus defined in the baggage compartment.

The opening 24 has dimensions able to allow an operator to enter the inside of the aircraft structure 14 from the outside of the aircraft structure 14.

The dimensions of the opening 24 are also able to allow the passage of luggage whose dimensions are prohibited in the passenger compartment.

To that end, the opening 24 is a through opening. It thus joins the outer surface 20 to the inner surface 22 of the aircraft structure 14.

The opening 24 here has a substantially rectangular shape, with rounded apices.

The aircraft door mechanism 12 comprises at least said aircraft structure 14, an aircraft door 26 and a guide system 28.

In the preferred embodiment of FIG. 2, the mechanism 12 also comprises a gear motor 30 and for example an electrical control system 32 of the gear motor 30.

As indicated above, the door 26 is a baggage compartment door, in the example of FIG. 2.

Figure 9:
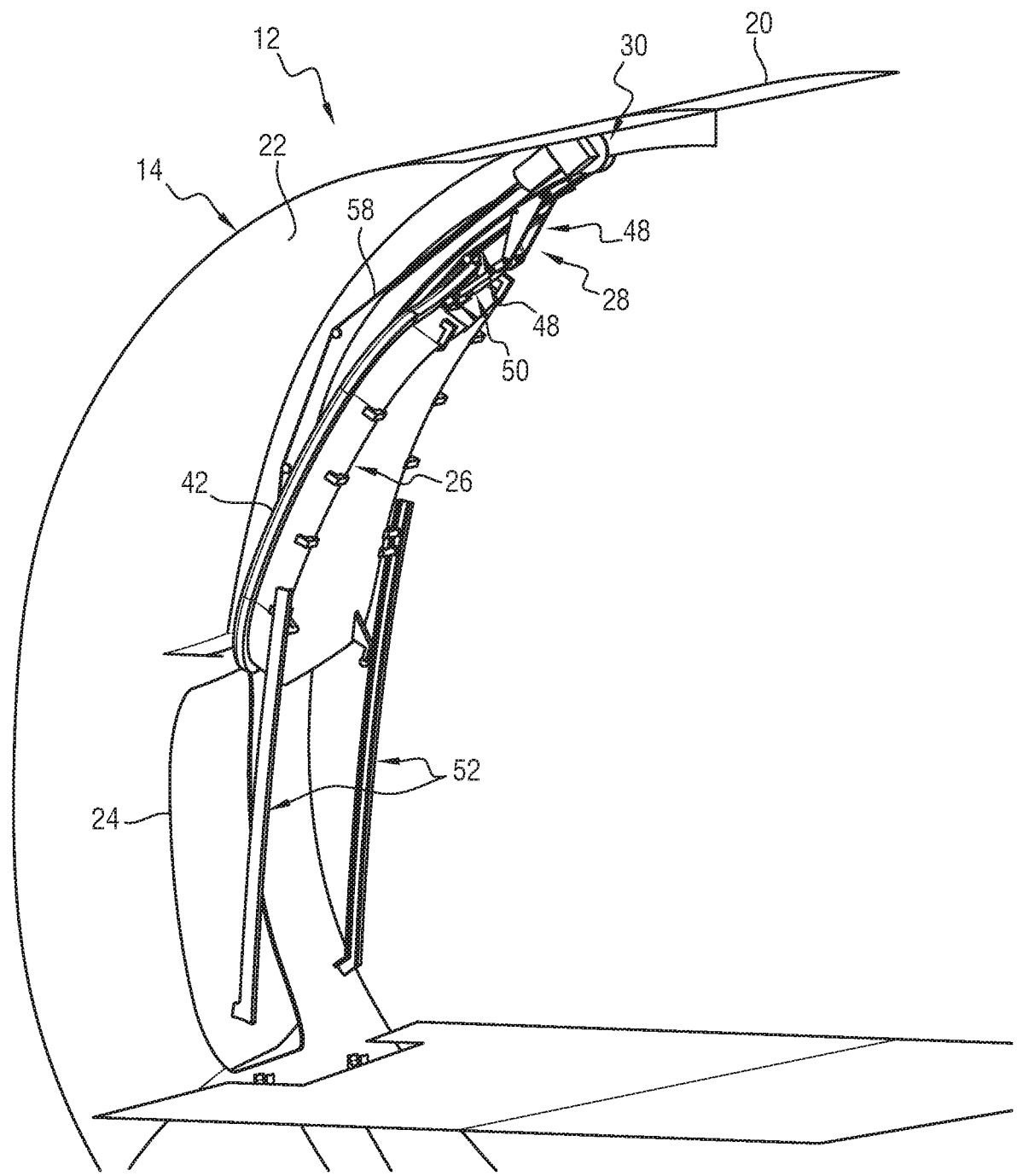
FIG. 9 is a schematic side view of the aircraft door mechanism, in which the door is in the released position.

The door 26 is mounted movably relative to the aircraft structure 14 between a closed off position, illustrated in FIG. 2 in which the door 26 closes off the opening 24, and a released position, illustrated in FIG. 9, in which the door 26 is positioned away from the opening 24.

In particular, FIG. 2, then 6 to 9, in that order, illustrate a complete movement of the door 26 from the closed off position to the released position.

In the closed off position, the door 26 tightly closes off the opening 24.

In the released configuration, the door 26 is positioned away from the opening 24.

Furthermore, in the released position, the door 26 and the opening 24 are not superimposed, projected on the inner surface 22 of the aircraft structure 14.

More specifically, in the released position, the door 26 is arranged entirely above the opening 24, projected in a vertical plane.

Thus, in the released position, an operator can enter through the opening 24 to the inside of the aircraft structure 14 from the outside of the aircraft structure 14, without the door 26 hindering the passage.

The door 26 comprises a base 34, a support body 36 protruding toward the inside of the aircraft structure 14 from the base 34, and a shoulder 38 between the base 34 and the support body 36.

The base 34 is able to be pressed against the aircraft structure 14, when the door 26 is in the closed off position.

The base 34 has an outer contour 40 for example having dimensions substantially equal to those of the opening 24, projected on the aircraft structure 14.

Furthermore, the dimensions of the outer contour 40 of the base 34 are greater than those of the support body 36, projected on the inner surface 22 of the aircraft structure 14.

The door 26 has an outer face 42 and an inner face 44.

The outer face 42 of the door 26 is in contact with a mass of air outside the aircraft 10, when the door 26 is in the closed off position.

In particular, the outer face 42 of the door 26 is flush with the outer surface 20 of the aircraft structure 14, when the door 26 is in the closed off position.

The inner face 44 of the door 26 here is defined by the support body 36.

Preferably, the inner face 44 has no handle. In particular, the inner face 44 has no protrusion and indentation.

The inner face 44 and the aircraft structure 14 for example have a same curve radius.

The door 26 is for example monobloc.

The guide system 28 is configured to guide a movement of the door 26 between said closed off and released positions.

Here and hereinafter, "a movement of the door 26 between said closed off and released positions" means either a movement of the door 26 from the closed off position to the released position, or a movement of the door 26 from the released position to the closed off position.

To this end, the guide system 28 comprises at least one main rail 46 that is fixed relative to the aircraft structure 14 and a main carriage 48 that is mechanically connected to the door 26.

The guide system 28 also advantageously comprises at least one connecting rod 50, preferably able to lock the door 26 in the closed off position as described in detail hereinafter.

For example, the guide system 28 comprises at least one lateral rail 52 that is stationary relative to the aircraft structure 14, preferably two lateral rails 52, and at least one lateral carriage 54 mechanically connected to the door 26, preferably two lateral carriages 54.

Furthermore, the guide system 28 preferably comprises at least two pairs 56 of pivot abutments, described in more detail hereinafter.

Furthermore, the guide system 28 comprises at least one mechanical transmission member 58 for the movement of the door 26.

The main rail 46 extends along a curve contained in the movement plane.

This movement plane is that of the movement of the door 26 between said closed off and released positions.

The guide system 28 is preferably configured so that the movement plane is perpendicular to the longitudinal direction of the aircraft 10.

The main rail 46 extends along its extension curve between a first end 60 close to the opening 24 and a second end 62 far away from the opening 24.

The main rail 46 is for example curved.

As illustrated in FIG. 9, the main rail 46 is positioned between the door 26 and the aircraft structure 14, during at least part of the movement of the door 26 between said closed off and released positions.

More specifically, during this part of the movement, the main rail 46 is positioned between the outer face 42 of the door 26 and the inner surface 22 of the aircraft structure 14.

This part of the movement for example comprises at least the released position of the door 26 (FIG. 9). More specifically, this part of the movement begins or ends with the door 26 in the released position.

In particular, the main rail 46 is positioned between the door 26 and the aircraft structure 14, when the door 26 is in the released position.

As illustrated in FIG. 2, the main rail 46 is positioned above the door 26, projected in a vertical plane, when the door 26 is in the closed off position.

Furthermore, the main rail 46 is positioned above the opening 24. In particular, the close first end 60 of the main rail 46 is positioned above the opening 24.

In section in the movement plane, the main rail 46 and the door 26 each have a respective predetermined length, the predetermined length of the main rail 46 being greater than the predetermined length of the door 26.

The main rail 46 is in particular fixed on a crosspiece 64, the crosspiece 64 being attached on the inner surface 22 of the aircraft structure 14. In a variant, the main rail 46 is fixed on the inner surface 22 of the aircraft structure 14.

The main rail 46 defines two opposite grooves 66.

Each of the grooves 66 of the main rail 46 extends along the extension curve.

The main rail 46 has a substantially H-shaped cross-section.

The mechanism 12 for example comprises a first stop 68 of the main carriage 48 in the closed off position of the door 26 and a second stop 70 of the main carriage 48 in the released position of the door 26.

The first stop 68 of the main carriage 48 is for example positioned at the first end 60 of the main rail 46.

The second stop 70 of the main carriage 48 is for example positioned at the far second end 62 of the main rail 46.

More specifically, in this example, the main carriage 48 abuts against the first stop 68 of the main rail 46, when the door 26 is in the closed off position, and abuts against the second stop 70 of the main rail 46, when the door 26 is in the released position.

Alternatively, the first stop 68 is made between at least one of the connecting rods 50 and the door 26.

Alternatively, the second stop 70 is made by a position sensor of the main carriage 48 comprised in the gear motor 30.

The main carriage 48 is able to slide on the main rail 46 during the movement of the door 26 between said closed off and released positions.

It is able to slide between the first and second stops 68, 70 of the main rail 46.

The main carriage 48 thus comprises a base body 72 and at least one sliding member 74 with the main rail 46.

The base body 72 is for example monobloc.

As illustrated in FIG. 2, the base body 72 of the main carriage 48 has an elongated shape extending past the close first end 60 of the main rail 46, when the door 26 is in the closed off position.

Furthermore, the elongated shape of the base body 72 extends past an upper edge of the opening 24, when the door 26 is in the closed off position. In particular, the elongated shape has a region that is superimposed with the door 26, projected on the door 26.

More specifically, the elongated shape of the base body 72 extends past an articulation end 86 of each connecting rod 50 with the door 26, when the door 26 is in the closed off position. In particular, the elongated shape is superimposed with the articulation end 86 of each connecting rod 50 with the door 26, projected on the inner surface 22 of the aircraft structure 14.

Figure 4:
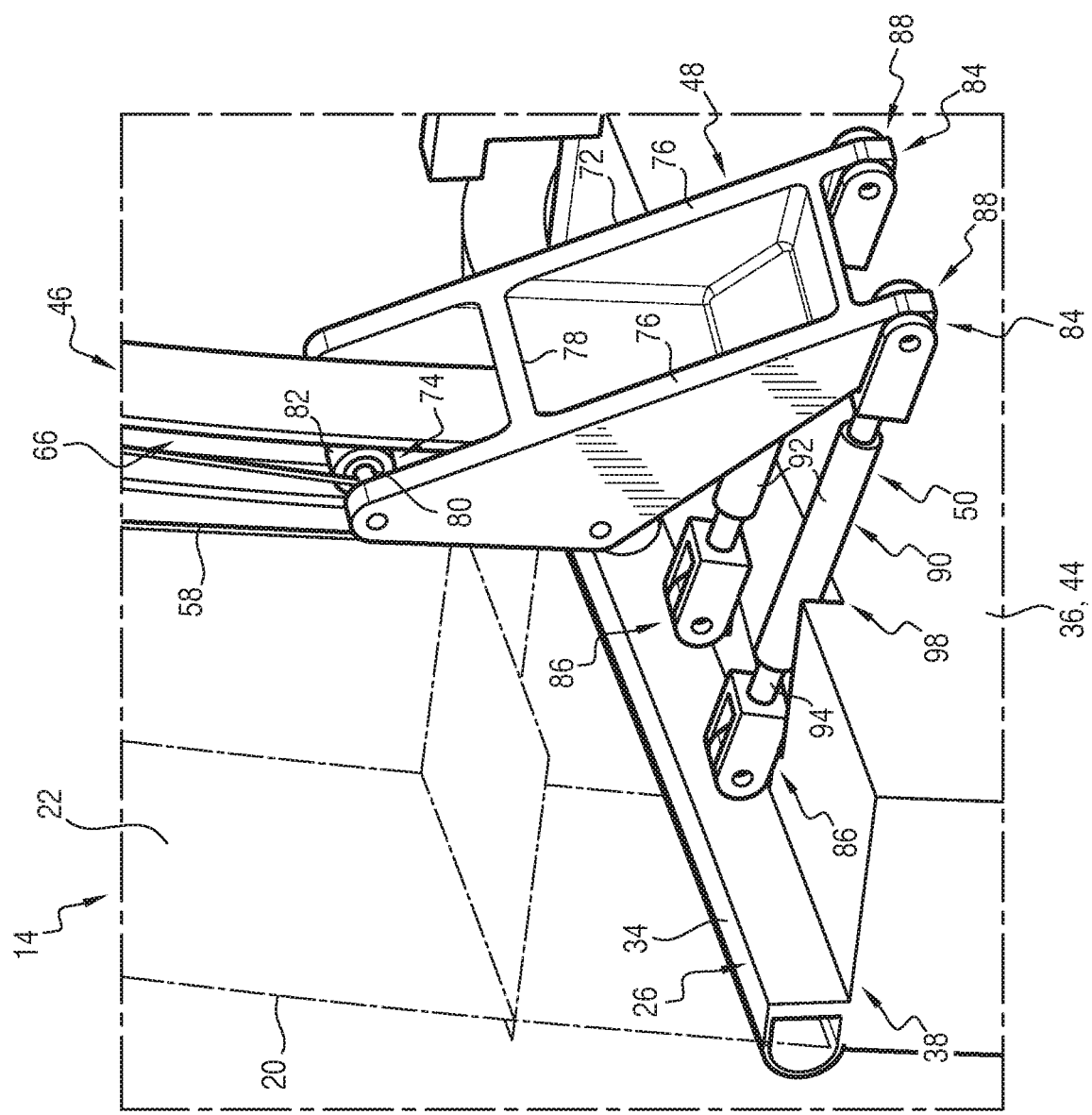

In the embodiment of FIG. 4, the base body 72 for example comprises two plates 76 connected to one another by a transverse wall 78.

The two plates 76 are positioned on either side of the main rail 46.

The two plates 76 are for example substantially identical.

Each plate 76 is partially opposite at least one of the grooves 66 of the main rail 46.

Each plate 76 has a substantially triangular shape. Said shape thus has three edges connecting, in pairs, three rounded apices.

A first apex and a second apex of each plate 76 are positioned opposite one of the grooves 66 of the main rail 46.

Thus, projected on the movement plane, the first apex and the second apex are superimposed with the main rail 46.

Furthermore, each plate 76 extends past the first end 60 of the main rail 46, and preferably past the upper edge of the opening 24, when the door 26 is in the closed off position.

Figure 5:
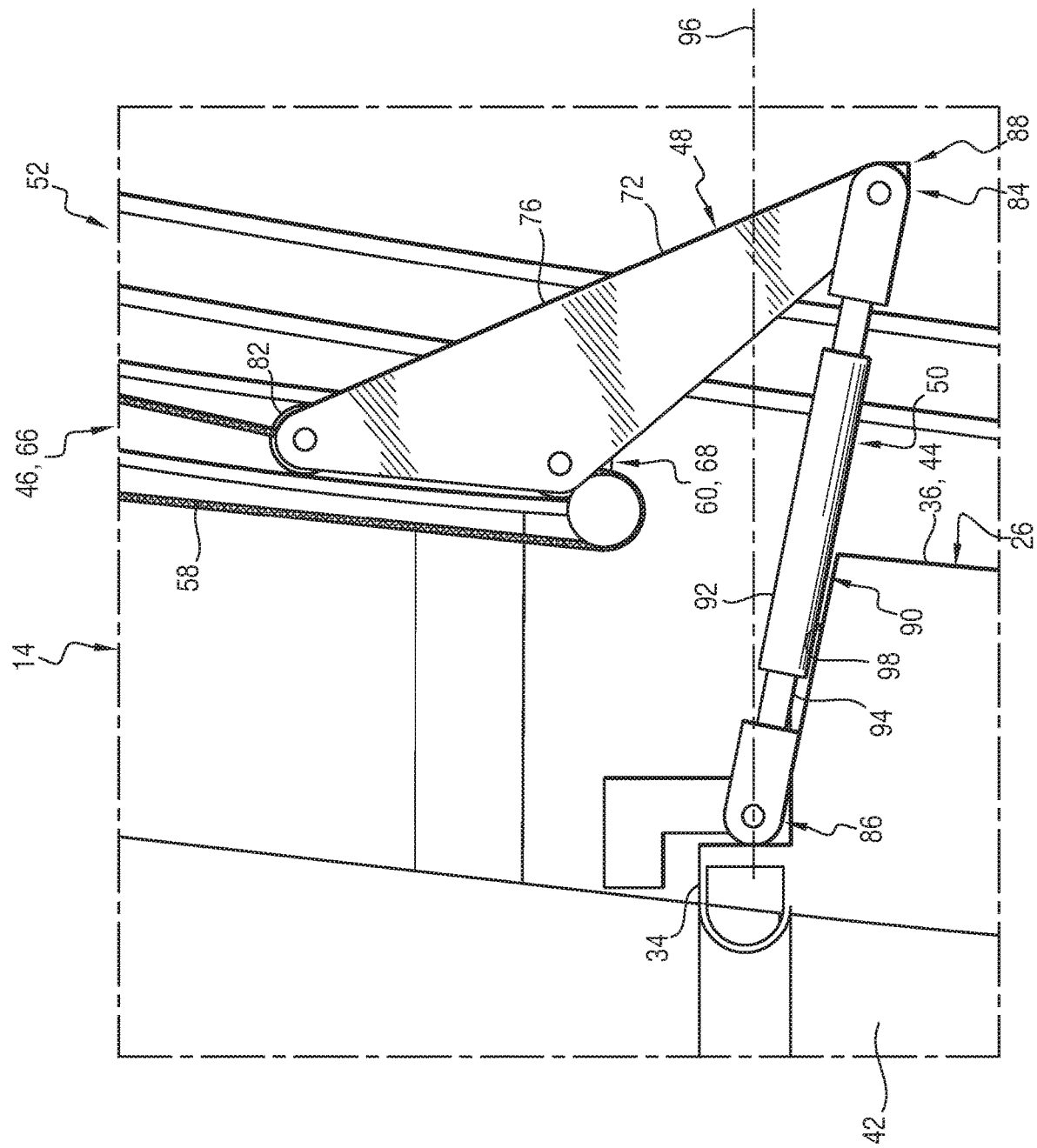
FIG. 5 is a sectional view of the mechanism of FIG. 2.
Figure 6:
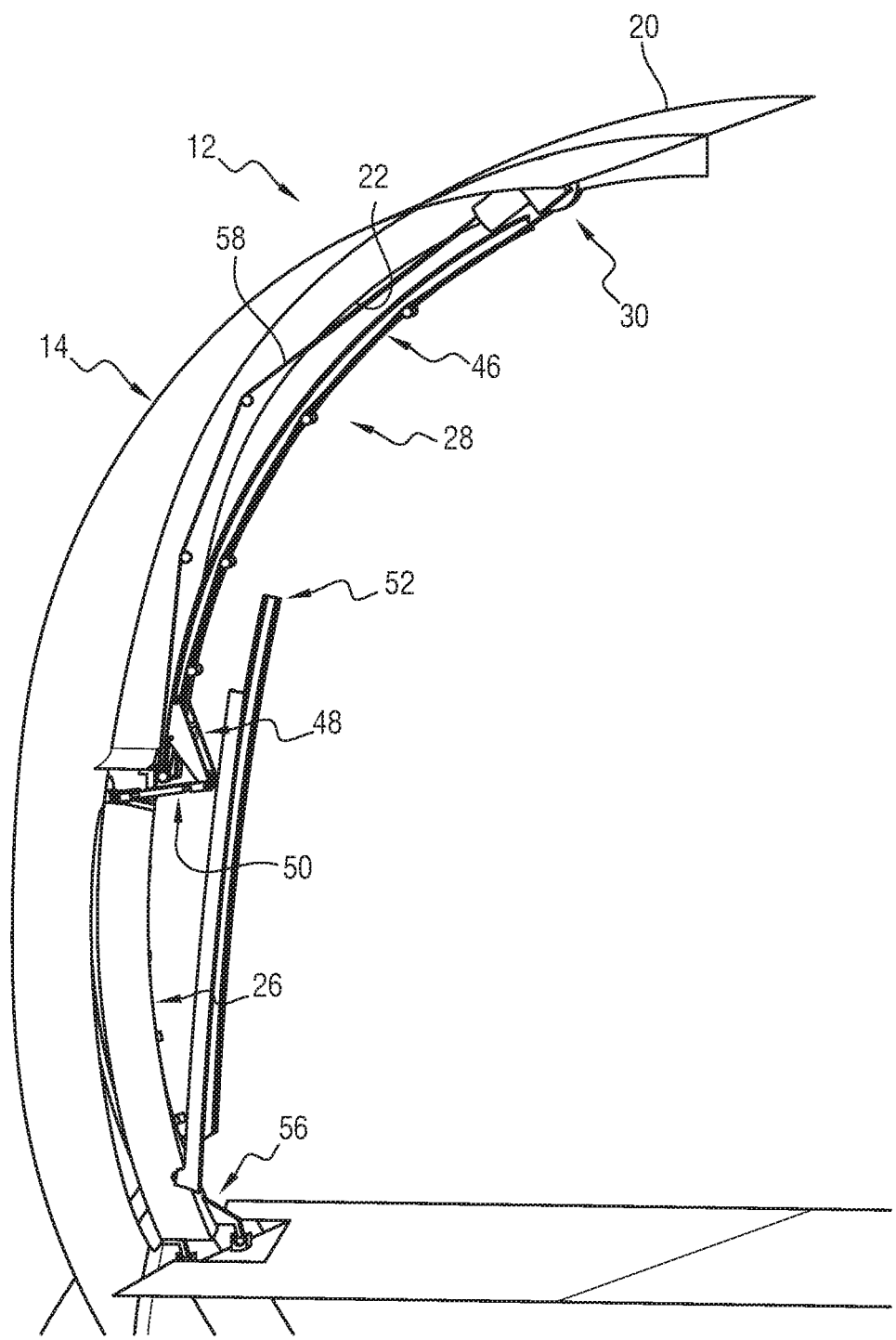
FIG. 6 is a schematic side view of the aircraft door mechanism, in which the door is no longer locked in the closed off position.

Furthermore, as illustrated in FIG. 5, each plate 76 extends past the articulation end 86 of each connecting rod 50 with the door 26, when the door 26 is in the closed off position.

More specifically, a third apex of each plate 76 is positioned past the articulation end 86 of each connecting rod 50 with the door 26, when the door 26 is in the closed off position.

In the preferred embodiment of FIG. 4, the main carriage 48 comprises a plurality of sliding members 74. In a variant, the main carriage 48 comprises only one sliding member 74, more than the number of sliding members 74 illustrated in FIG. 4 or less than the illustrated number of members.

In particular, the main carriage 48 comprises two pairs of sliding members 74 that are opposite relative to the main rail 46. In a variant, the main carriage 48 comprises a single pair or more than two pairs of opposites sliding members.

The two sliding members 74 of each pair are positioned in the same position along the main rail 46.

Each sliding member 74 is fastened to the base body 72 of the main carriage 48.

During the movement of the door 26 between said closed off and released positions, each sliding member 74 is in contact with the main rail 46 and slides along one of the grooves 66 of the main rail 46.

Each sliding member 74 keeps the base body 72 away from the main rail 46.

As illustrated in FIG. 4, each sliding member 74 for example comprises a rod 80 secured to a sliding member 82.

Each sliding member 74 is fastened to one of said first and second apices of the triangular shape of one of the plates 76 of the base body 72.

More specifically, the rod 80 of each sliding member 74 is thus fastened to the base body 72.

The sliding member 82 is able to cooperate with the main rail 46. It is received in one of the grooves 66 of the main rail 46.

The sliding member 82 has a circular peripheral surface.

The peripheral surface of the sliding member 82 is in contact with the main rail 46.

In the example illustrated in FIG. 4, the guide system 28 comprises two connecting rods 50. In a variant, however, the guide system 28 comprises only one. In still another variant, the guide system 28 comprises more than two connecting rods 50.

The connecting rods 50 are arranged parallel to one another.

During the movement of the door 26 between the closed off and released positions, each connecting rod 50 preferably moves while lying in a plane parallel to the movement plane.

Each connecting rod 50 is such that the main carriage 48 is mechanically connected to the door 26 by means of the connecting rod 50.

The main carriage 48 thus has no contact with the door 26.

More specifically, each connecting rod 50 is articulated to the main carriage 48 on the one hand and to the door 26 on the other hand.

In other words, each connecting rod 50 has a first articulation end 84 with the main carriage 48, and a second articulation end 86 with the door 26 opposite the first articulation end 84.

The second articulation end 86 with the door 26 is positioned on an upper surface of the support body 36 of the door 26.

Preferably, for each connecting rod 50, projected in the movement plane, an angle between the connecting rod 50 and the main carriage 48 is limited by an angle stop 88 positioned on the connecting rod 50 or on the main carriage 48.

Each connecting rod 50 includes an extension return system 90 configured to exert an elastic force on the main carriage 48.

For example, said extension return system 90 includes at least one resiliently deformable member configured to exert the elastic force on the main carriage 48.

The resiliently deformable member is for example a spring.

Said extension return system 90 for example comprises a hollow main body 92, a secondary body 94 able to slide in the main body 92, and said resiliently deformable member constraining the secondary body 94 toward the outside of the main body 92.

The first articulation end 84 with the main carriage 48 is made by the secondary body 94 or the main body 92.

Each connecting rod 50 is preferably able to lock the door 26 in the closed off position.

Figure 7:
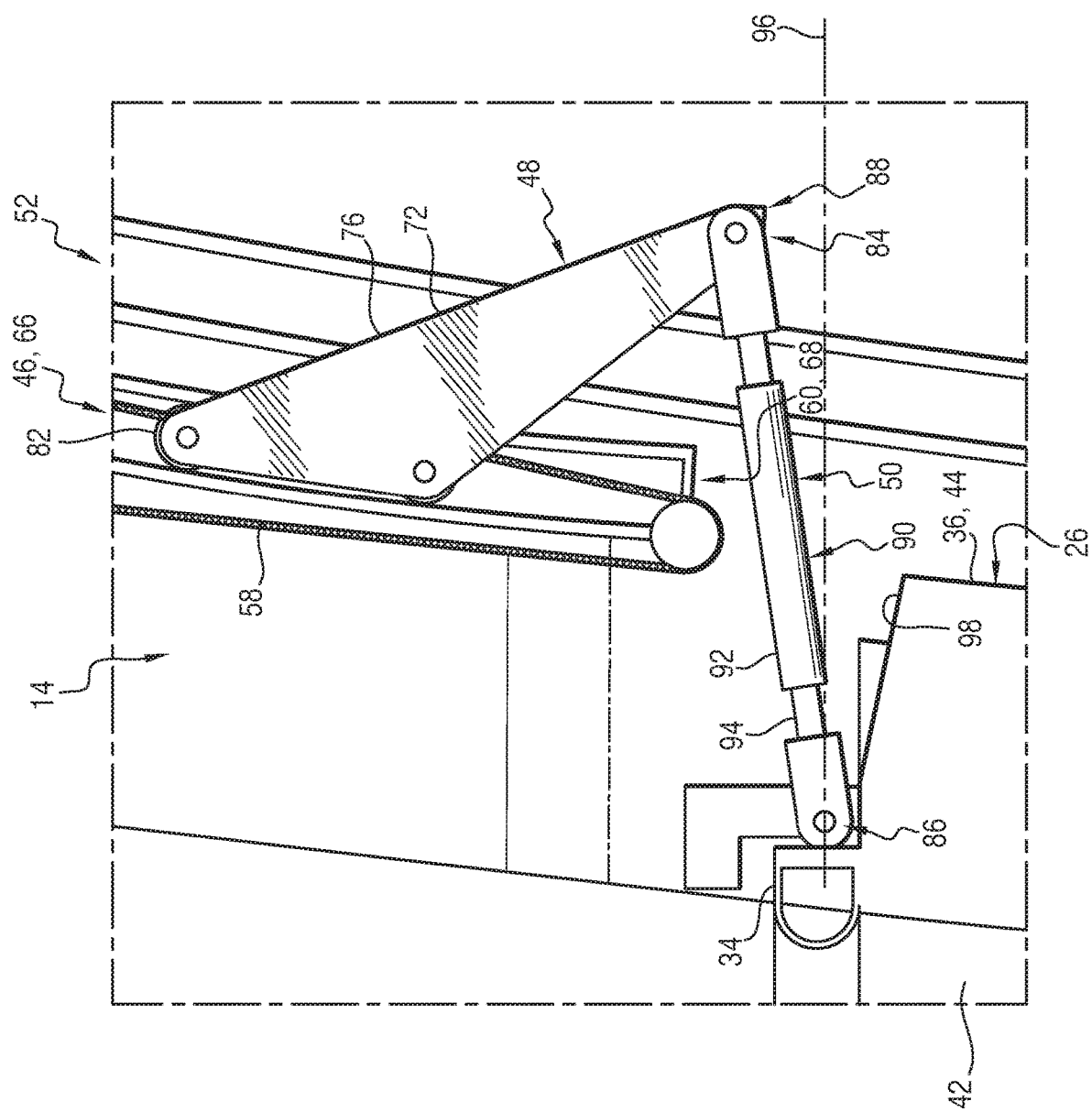
FIG. 7 is a sectional view of the mechanism of FIG. 6.

More specifically, in one advantageous embodiment illustrated in FIGS. 5 and 7, the connecting rod 50 is able to be over-centered relative to the main carriage 48.

In particular, the connecting rod 50 is arranged past an over-centered limit 96 relative to the main carriage 48, when the door 26 is in the closed off position.

The over-centered limit 96 is a position of the connecting rod 50 relative to the main carriage 48, from which the elastic force exerted by the extension return system 90 of the connecting rod 50 changes directions relative to the extension curve of the main rail 46.

When the connecting rod 50 is on one side of the over-centered limit 96, the elastic force exerted by the extension return system 90 of the connecting rod 50 on the main carriage 48 is oriented toward the distant second end 62 of the main rail 46, and when the connecting rod 50 passes to the other side of the over-centered limit 96, the elastic force exerted by the extension return system 90 of the connecting rod 50 on the main carriage 48 is oriented opposite the distant second end 62 of the main rail 46 and opposes the movement of the door 26 toward the released position.

In the example illustrated in FIG. 5, the first articulation end 84 of the connecting rod 50 is to this end connected with a region of the base body 72 of the main carriage 48 that is positioned past the close first end 60 of the main rail 46, when the door 26 is in the closed off position.

In particular, the first articulation end 84 of the connecting rod 50 is connected to the third apex of one of the plates 76 of the base body 72 of the main carriage 48.

Furthermore, the upper surface of the support body 36 for example comprises an oblique recess 98 receiving each connecting rod 50, when the door 26 is in the closed off position. In a variant, the entire upper surface of the support body 36 thus extends obliquely relative to the base 34 of the door 26.

In the example of FIG. 2, the guide system 28 comprises two lateral rails 52 and one lateral carriage 54 per lateral rail 52. In a variant, the guide system 28 does not comprise any. In another variant, the guide system 28 comprises only one lateral rail 52 and one lateral carriage 54. In still another variant, the guide system 28 comprises more than two lateral rails 52 and one lateral carriage 54 for each lateral rail 52.

Each lateral rail 52 is able to cooperate with the associated lateral carriage 54 such that the associated lateral carriage 54 is able to slide on the lateral rail 52 during the movement of the door 26 between said closed off and released positions.

Each lateral rail 52 extends in a plane parallel to the movement plane.

As illustrated in FIG. 2, each lateral rail 52 for example has a region extending along a straight line.

The two lateral rails 52 here are positioned on either side of the movement plane.

Projected on the aircraft structure 14, each lateral rail 52 and the door 26 are positioned separated from one another.

More specifically, each lateral rail 52 and the door 26 are not superimposed, projected on the inner surface 22 of the aircraft structure 14, in the closed off position of the door 26, or in the released position, or throughout all of the movement of the door 26 between said closed off and released positions.

In particular, projected on the aircraft structure 14, the two lateral rails 52 here are positioned on either side of the door 26, when the door 26 is in the closed off position.

Each lateral rail 52 has a groove 104.

The cross-section of each lateral rail 52 is for example substantially U-shaped.

Each lateral carriage 54 comprises a base body 106 and a sliding member 108 with the lateral rail 52.

The base body 106 of the lateral carriage 54 is for example monobloc.

The base body 106 is fastened to the door 26.

The sliding member 108 is fastened to the base body 106 of the lateral carriage 54.

During the movement of the door 26 between said closed off and released positions, the sliding member 108 is in contact with the lateral rail 52 and slides along the groove 104 of the lateral rail 52.

The sliding member 108 keeps the base body 106 of the lateral carriage 54 separated from the lateral rail 52.

The sliding member 108 is able to cooperate with the lateral rail 52. It is received in the groove 104 of the lateral rail 52.

The sliding member 108 has a circular peripheral surface.

The peripheral surface of the sliding member 108 is in contact with the lateral rail 52.

Figure 3:
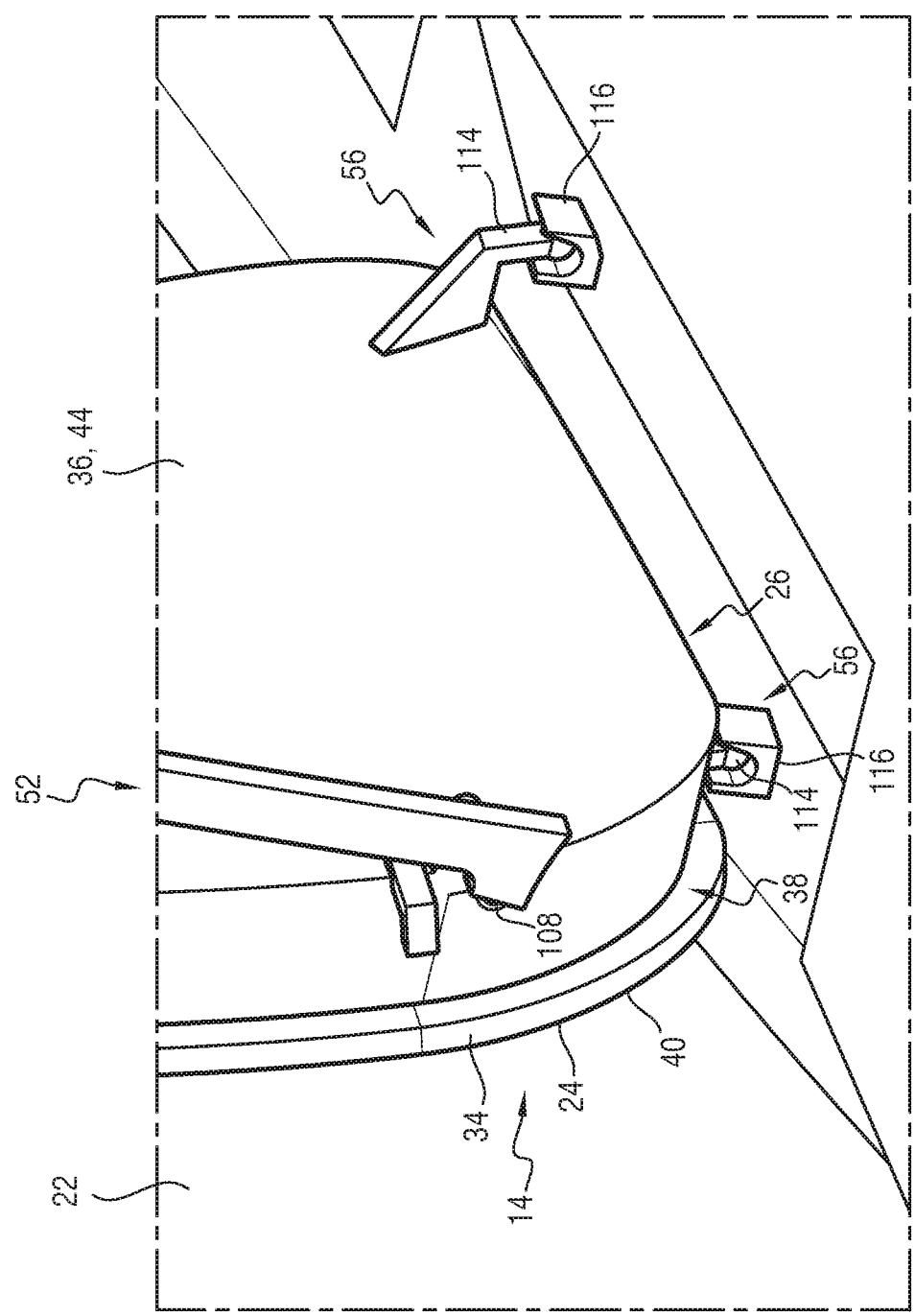
FIGS. 3 and 4 are schematic perspective views of the mechanism of FIG. 2.
Figure 8:
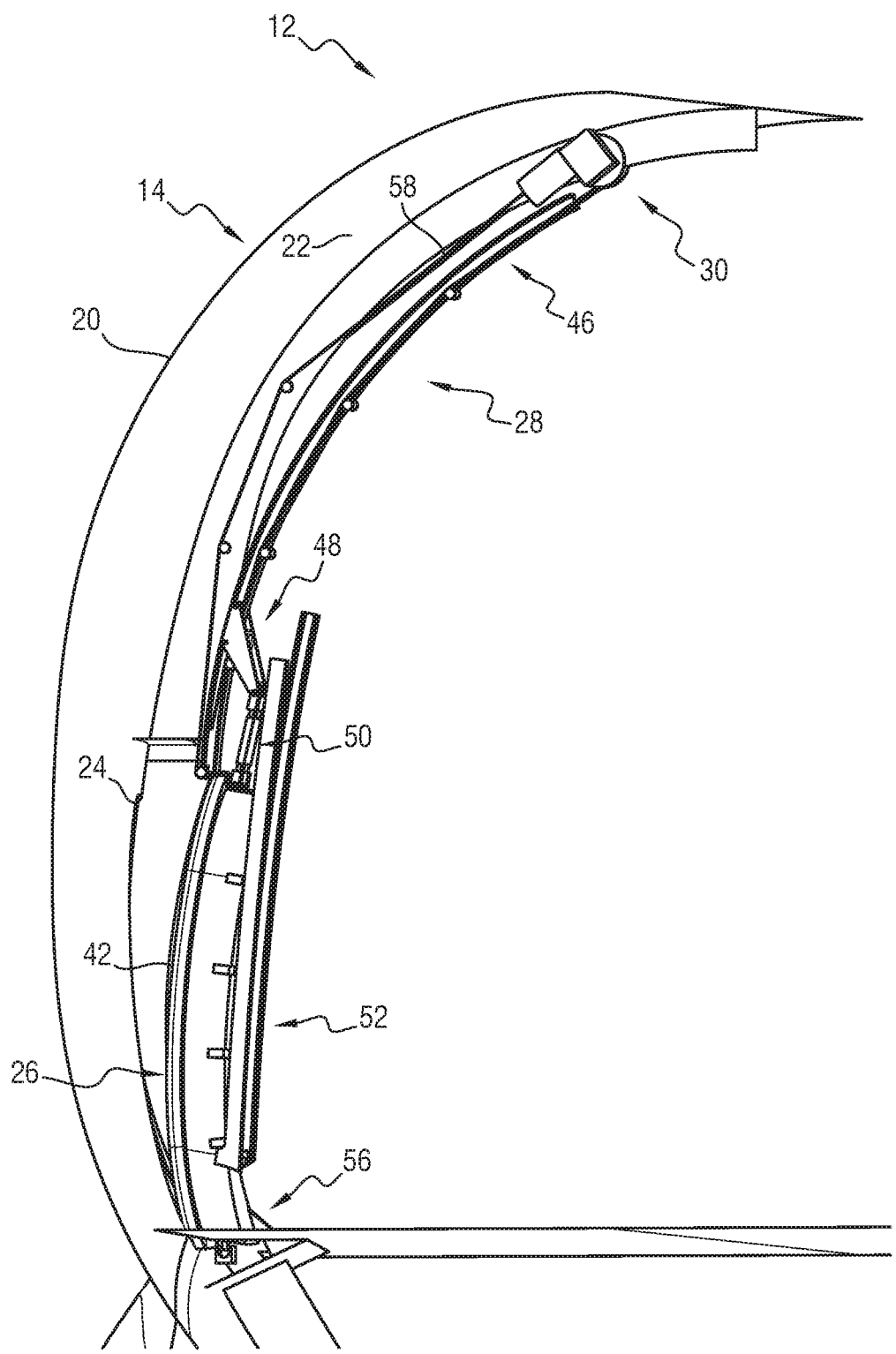
FIG. 8 is a schematic side view of the aircraft door mechanism during the movement of the door between the closed off and released positions.

In the preferred embodiment of FIGS. 2, 3 and 8, the pairs of abutments 56 of the guide system 28 form a pivot support of the door 26 relative to the structure during at least part of the movement of the door 26 between said closed off and released positions.

This part of the movement of the door 26 comprises the closed off position. More specifically, this part of the movement begins or ends with the door 26 in the closed off position.

Each pair of abutments 56 comprises an upper abutment 114 secured to the door 26 and a lower abutment 116 secured to the aircraft structure 14.

When the pairs of abutments 56 form the pivot support of the door 26, the lower and upper abutments 114, 116 of each pair 56 are respectively in contact.

A pivot axis then passes through each pair 56 while being perpendicular to said movement plane.

"A pivot axis passing through each pair" refers to an axis passing through a center of each contact surface between the upper abutment 114 and the lower abutment 116 of each pair 56.

For each pair 56, each upper abutment 114 is positioned vertically above the lower abutment 116.

Each lower abutment 116 is positioned vertically below a lower edge of the door 26, when the door 26 is in the closed off position.

Furthermore, for each pair of abutments 56, one of the upper abutment 114 and the lower abutment 116 is a finger and the other is a housing able to receive one contact end of the finger.

Thus, in the example illustrated in FIGS. 2 and 3, each upper abutment 114 is such a finger and each lower abutment 116 is such a housing.

The contact end of the finger with the associated housing is preferably spherical.

As illustrated in FIG. 3, each housing for example has a trough having a U-shaped section. In a variant, each housing has a spherical cavity. In still another variant, each housing has any shape suitable for receiving the contact end of the associated finger.

In the example of FIG. 2, the guide system 28 comprises two mechanical transmission members 58. In a variant, the guide system 28 comprises a single mechanical transmission member 58. In still another variant, the guide system 28 comprises more than two mechanical transmission members 58.

Each mechanical transmission member 58 is for example a cable, a belt or a chain.

Each mechanical transmission member 58 is secured to the main carriage 48 and is connected to the gear motor 30.

Each mechanical transmission member 58 is elongated.

In particular, each mechanical transmission member 58 extends between two opposite ends. Each end of the mechanical transmission member 58 is in this example attached to the main carriage 48.

In the particular embodiment of FIGS. 4 and 5, each end of the mechanical transmission member 58 is attached to one of the sliding members of the main carriage 48, for example to the rod 80 of the sliding member 74.

Here, each end of the mechanical transmission member 58 is respectively attached to different sliding members 74.

For example, each mechanical transmission member 58 extends on a same side of the movement plane.

The gear motor 30 is able, by itself, to supply the mechanical energy necessary to move the door 26 relative to the structure between said closed off and released positions.

More specifically, the gear motor 30 is able to mechanically actuate each mechanical transmission member 58 in order to move the door 26 relative to the aircraft structure 14 between said closed off and released positions.

"Mechanically actuate" means that the gear motor 30 imposes a movement of each mechanical transmission member 58 in order to move the door 26 relative to the aircraft structure 14.

The gear motor 30 comprises an electric motor 118, a transmission shaft 120, a reduction gear 122 and an output shaft 124.

The electric motor 118 is able to convert electrical energy into mechanical energy.

The electric motor 118 has a nominal operating configuration, in which it converts electrical energy into mechanical energy, and a stopped configuration.

The electric motor 118 typically comprises a rotor and a stator.

The rotor rotates the transmission shaft 120 at a nominal speed, when the motor is in the nominal operating configuration.

When the electric motor 118 is in the stopped configuration, the rotor and the stator are immobile relative to one another.

The reduction gear 122 is connected to the transmission shaft 120 and to the output shaft 124.

The reduction gear 122 is able to rotate the output shaft 124 at a speed lower than the nominal rotation speed of the transmission shaft 120 imposed by the electric motor 118.

The reduction gear 122 is for example formed by a set of gears.

Thus, once the door 26 reaches the closed off position or the released position, the electric motor 118 is configured to go from the nominal operating configuration to the stopped configuration.

The gear motor 30 is preferably irreversible.

"Irreversible" means that when the electric motor 118 is in the stopped configuration, the transmission shaft 120 is blocked in rotation. In particular, an outside torque exerted on the transmission shaft 120 is not able to rotate the rotor of the electric motor 118.

Thus, when the door 26 is in the released position and the electric motor 118 is in the stopped configuration, the door 26 is kept in position.

The electrical control system 32 of the gear motor 30 is able to take the electric motor 118 from the stopped configuration to the nominal operating configuration, when it is activated.

In particular, the electrical control system 32 is able to be activated manually by an operator.

The electrical control system 32 is for example arranged in the aircraft structure 14.

The avionics system 16 is intended to assist with the piloting of the aircraft 10.

The device 18 for producing and/or storing electricity is configured to supply the avionics system 16 and the gear motor 30.

In particular, the device 18 for producing and/or storing electricity is electrically connected on the one hand to the avionics system 16 and on the other hand to the gear motor 30.

A method for moving the aircraft door 26 will now be described, in reference to FIGS. 2, and 6 to 9.

The method comprises providing the mechanism 12 described above.

Initially, the door 26 is either in the closed off position or in the released position.

The method then comprises moving the door 26 toward the other position. The movement is guided by the guide system 28, the main rail 46 being positioned between the door 26 and the structure during at least part of the movement of the door 26, as described in more detail hereinafter.

In the more specific example illustrated in the figures, the door 26 is initially in the closed off position.

The illustrated movement is that from the closed off position to the released position.

Initially, the elastic force exerted by the extension return system 90 of each connecting rod 50 on the main carriage 48 opposes the movement of the door 26 toward the released position.

During the movement of the door 26 between said closed off and released positions, each sliding member 74 is in contact with the main rail 46 and slides along one of the grooves 66 of the main rail 46.

Likewise, during this movement, each sliding member 108 is in contact with the associated lateral rail 52 and slides along the groove 104 of the lateral rail 52.

The mechanical energy necessary to move the door 26 relative to the structure between said closed off and released positions is preferably supplied by the gear motor 30.

More specifically, during the movement of the door 26 between said positions, the gear motor 30 mechanically actuates each mechanical transmission member 58 in order to move the door 26 relative to the aircraft structure 14.

During the movement of the door 26 between said positions, the gear motor 30 imposes a movement of each mechanical transmission member 58 in order to move the door 26 relative to the aircraft structure 14.

Initially, the electric motor 118 of the gear motor 30 is in the stopped configuration.

The movement is triggered here by the activation of the electrical control system 32 of the gear motor 30, which causes the electric motor 118 from the stopped configuration to the nominal operating configuration.

The movement comprises a first step for unlocking the door 26.

During this first unlocking step, the main carriage 48 is pulled by the gear motor 30, by means of each mechanical transmission member 58.

Each connecting rod 50 goes from the position illustrated in FIG. 5 to the position illustrated in FIG. 7.

In particular, each connecting rod 50 pivots, relative to the main carriage 48, while being pulled by the main carriage 48.

Each connecting rod 50 exceeds the over-centered limit 96 relative to the main carriage 48.

Thus, the elastic force exerted by the extension return system 90 of each connecting rod 50 on the main carriage 48 changes directions relative to the extension curve of the main rail 46.

In particular, the elastic force exerted by the extension return system 90 of each connecting rod 50 no longer opposes the movement of the door from the closed off position toward the released position.

The door 26 is then unlocked from its closed off position.

During this unlocking step, the door 26 is fixed in position relative to the aircraft structure 14.

In particular, the second articulation end 86 with the door 26 of each connecting rod 50 stays fixed in position relative to the aircraft structure 14.

Furthermore, the lower and upper abutments 114, 116 of each pair of abutments 56 of the guide system 28 are respectively in contact.

The movement of the door 26 subsequently comprises a switching step of the door 26.

During this switching step, the pairs of abutments 56 of the guide system 28 form a pivot support of the door 26 relative to the structure. More specifically, the lower and upper abutments 114, 116 of each abutment 56 are respectively in contact.

A pivot axis passes through each pair 56 while being perpendicular to said movement plane.

The door 26 rotates about this pivot axis from the closed off position to a predetermined end of rotation position, like that illustrated in FIG. 8.

The predetermined end of rotation position is a position of the door or an upper edge of the outer face 42 of the door 26 beyond the close first end 60 of the main rail 46.

The door 26 therefore does not abut against the main rail 46 during the continuation of the movement.

Furthermore, during the switching step, the main carriage 48 and each connecting rod 50 pull the door 26, and the respective angle between each connecting rod 50 and the main carriage 48 increases up to a maximum angle limited by the angle stop 88.

More specifically, for each connecting rod 50, when the door 26 reaches the predetermined end of rotation position, the angle between the connecting rod 50 and the main carriage 48 is then limited by the angle stop 88.

As illustrated in FIG. 8, the maximum angle here is for example obtuse.

The movement of the door 26 hereinafter has a step for translation of the door 26, during which the door 26 is pulled by the connecting rod 50 and the carriage along the main rail 46 to the released position.

From the beginning of the translation step, the lower abutment 116 and the upper abutment 114 of each pair 56 are no longer in contact with one another.

When the door 26 reaches the released position (FIG. 9), the electric motor 118 of the gear motor 30 enters the stopped configuration.

The door 26 is thus kept in the released position.

In a variant of the method, the door 26 is initially in the released position at the beginning of the movement step.

The steps of the movement are then the same as those described above, but implemented in the opposite direction.

In particular, the movement ends with a step for locking of the door 26 in the closed off position that corresponds to the above unlocking step implemented in the opposite direction.

At the end of the locking step, the electric motor 118 of the gear motor 30 enters its stopped configuration.

The door 26 is thus kept in position both by the fact that the electric motor 118 of the gear motor 30 is in this stopped configuration and by the locking implemented by each connecting rod 50.

In addition, in the case of a failure of the gear motor 30 and/or of the electricity production and/or storage device 18, it is still possible to move the door 26 between its two positions.

The movement of the method then comprises the disengagement of the gear motor 30, and the manual manipulation of the main carriage 48 in order to unlock the door 26 from its closed off position. In a variant, the movement of the method then comprises a manual command on the gear motor 30.

In a variant of the mechanism 12 described above, said extension return system 90 of the connecting rod 50 comprises a gas cylinder as a replacement for or in addition to the resiliently deformable member.

Owing to the features previously described, the mechanism 12 according to the present disclosure has good ergonomics and good robustness.

The present disclosure also achieves a significant weight reduction.

Additionally, the mechanism 12 according to the present disclosure has a low space requirement in the absence of weight compensators.

Furthermore, the perceived quality is greatly improved.

Lastly, the ergonomics are still further improved in the case where the mechanism comprises the gear motor 30, since it is not necessary for the operator to place himself in a restrictive position in order to move the door 26. In this case, the connecting rods 50 provide a locking device that is compatible with the use of such a gear motor 30 in order to move the door 26.

What is claimed is:

1. An aircraft door mechanism comprising:
an aircraft structure delimiting an opening, the aircraft structure having an outer surface and an inner surface;
an aircraft door mounted movable relative to the aircraft structure between a closed off position, in which the aircraft door closes off the opening, and a released position, in which the aircraft door is positioned away from the opening, the aircraft door having an outer face and an inner face, the outer face being in contact with a mass of air outside the aircraft structure, when the aircraft door is in the closed off position; and
a guide system configured to guide a movement of the aircraft door between the closed off and released positions, the guide system comprising a main rail that is fixed relative to the aircraft structure and a main carriage mechanically connected to the aircraft door, the main carriage being configured to slide on the main rail during the movement of the aircraft door between the closed off and released positions, the main rail being positioned between the outer face of the aircraft door and the inner surface of the aircraft structure during at least part of the movement of the aircraft door between the closed off and released positions;
wherein the guide system further comprises at least one connecting rod, the main carriage being mechanically connected to the aircraft door by the connecting rod, the connecting rod having at least a first articulation end with the main carriage and a second articulation end with the aircraft door, the second articulation end defining a center of rotation of the connecting rod with respect to the aircraft door, the center of rotation being fixed in position with respect to the outer face of the aircraft door;
wherein the connecting rod is configured to lock the aircraft door in the closed off position, the connecting rod including an extension return system configured to exert an elastic force on the main carriage, and the connecting rod being configured to be over-centered relative to the main carriage.

2. The aircraft door mechanism according to claim 1, wherein the guide system further comprises at least two pairs of abutments, each pair of abutments comprising an upper abutment secured to the aircraft door and a lower abutment secured to the aircraft structure, the pairs of abutments forming a pivot support for the aircraft door relative to the aircraft structure during at least part of the movement of the aircraft door between the closed off and released positions.

3. The aircraft door mechanism according to claim 2, wherein the main rail extends along a curve contained in a movement plane, and, when the pairs of abutments form a pivot support of the aircraft door, the lower and upper abutments of each pair of abutments are respectively in contact, a pivot axis passing through each pair of abutments being perpendicular to the movement plane.

4. The aircraft door mechanism according to claim 2, wherein, for each pair of abutments, one of the upper abutment and the lower abutment is a finger and the other is a housing configured to receive one end of the finger.

5. An aircraft including the aircraft door mechanism according to claim 1.

6. The aircraft according to claim 5, wherein the aircraft structure defines a baggage compartment, the opening being defined in the baggage compartment and the aircraft door being a baggage compartment door.

7. The aircraft according to claim 5, wherein the mechanism comprises a gear motor, the guide system further comprising at least one mechanical transmission member, the at least one mechanical transmission member being secured to the main carriage and being connected to the gear motor, the gear motor being configured to mechanically actuate the at least one mechanical transmission member in order to move the aircraft door relative to the aircraft structure between the closed off and released positions, the aircraft comprising an avionics system and an electricity production and/or storage device, the electricity production and/or storage device supplying power to the avionics system and the gear motor.

8. The aircraft door mechanism according to claim 1, wherein the extension return system of the connecting rod comprises at least one resiliently deformable member or gas cylinder.

9. The aircraft door mechanism according to claim 1, wherein the main rail extends along a curve contained in a movement plane, and, projected in the movement plane, an angle between the connecting rod and the main carriage is limited by an angle stop positioned on the connecting rod or on the main carriage.

10. The aircraft door mechanism according to claim 1, wherein the guide system further comprises at least one lateral rail that is fixed relative to the aircraft structure, and a lateral carriage, the lateral carriage being mechanically connected to the aircraft door and configured to slide on the lateral rail during the movement of the aircraft door between the closed off and released positions.

11. The aircraft door mechanism according to claim 1, wherein the aircraft door has an inner face with no protrusion nor indentation.

12. The aircraft door mechanism according to claim 1, comprising a gear motor, the guide system further comprising at least one mechanical transmission member, the at least one mechanical transmission member being secured to the main carriage and being connected to the gear motor, the gear motor being configured to mechanically actuate the at least one mechanical transmission member in order to move the aircraft door relative to the aircraft structure between the closed off and released positions.

13. A method for moving an aircraft door comprising:
providing the aircraft door mechanism according to claim 1, the aircraft door being in one of the closed off position and the released position; and
moving the aircraft door toward the other of the closed off position and the released position, the movement being guided by the guide system, the main rail being positioned between the aircraft door and the aircraft structure during at least part of the movement of the aircraft door.

* * * * *